J. S. WATROUS.
Mode of Raising Cream.
No. 198,171.                    Patented Dec. 11, 1877.
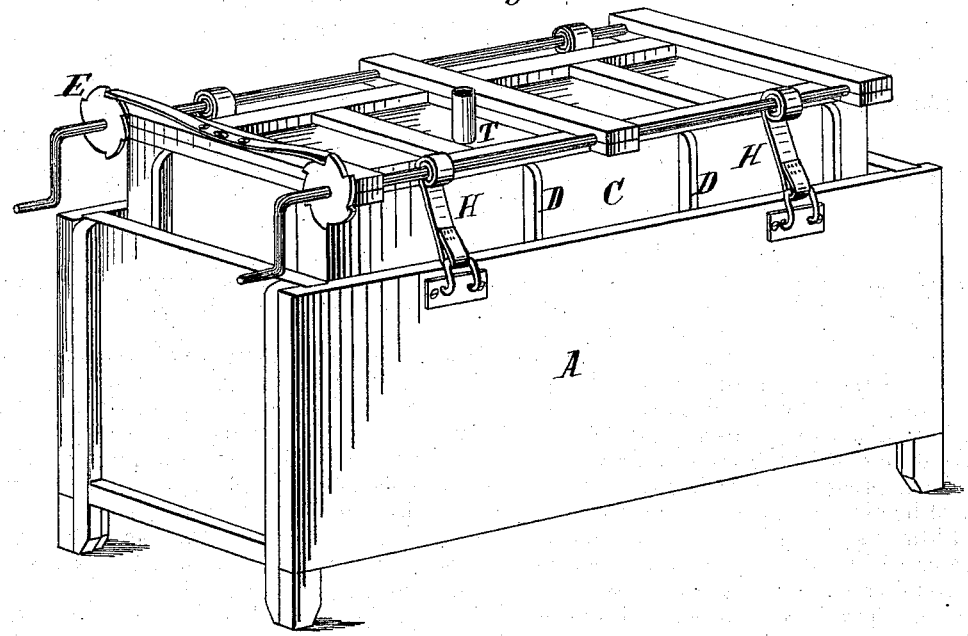
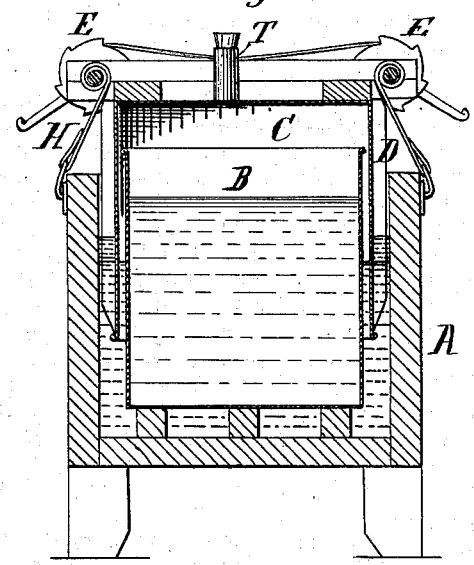
Witnesses
Alexander Mahon
John G. Center
Inventor:
James S. Watrous
by A. M. Smith,
Atty

UNITED STATES PATENT OFFICE.

JAMES S. WATROUS, OF RIDGEFIELD, ILLINOIS.

IMPROVEMENT IN THE MODE OF RAISING CREAM.

Specification forming part of Letters Patent No. 198,171, dated December 11, 1877; application filed October 24, 1877.

*To all whom it may concern:*

Be it known that I, JAMES S. WATROUS, of Ridgefield, in the county of McHenry and State of Illinois, have invented a new and Improved Mode of Obtaining or Raising Cream from Milk; and I do hereby declare that the following is a full and exact description thereof.

The invention consists in the employment of atmospheric pressure artificially applied to the milk, to be obtained by inclosing the milk in an air-tight vessel, and the application of such force as will condense the milk, liberate the cream, and cause it to rise to the surface.

The drawing hereto annexed exhibits one of the several plans which may be adopted in conformity to the foregoing specification.

To produce an air-tight vat I use a common tin milk-vat, set in a water-vat, but supported considerably above the bottom of the water-vat, and with a space three or four inches wide around the sides of the milk-vat for water, the milk-vat being properly filled, and the water in the water-vat at about the same height. I then take another vat, similar to the milk-vat, but one or two inches wider and longer, and considerably deeper, and invert it over the milk-vat. It is then forced down into the water by means of windlasses or other power, as shown by the accompanying drawing, until a pressure of sixty pounds or more to the square foot is obtained, where it is firmly held, and the cream will all, or nearly all, rise to the top of the milk in from thirty to sixty minutes.

In this operation the water is used only to prevent the air from escaping while the pressure is given by the inverted vat or cover, and the water may be any temperature below 75°.

If the quantity of milk be small, no machinery will be necessary, and the inverted cover may be forced down by hand, and held by weight or otherwise; but with a large quantity of milk, very strong appliances for forcing down the inverted vat or cover will be required, and as, with a large vat, the air is liable to slowly escape, I connect an air-pump by means of a tube in the top of the inverted vat, (letter T, Figure 1,) so that a supply of air can be kept up and the pressure not diminished. The tube connecting the air-pump must have a stop-cock, to close when the pump is not operated.

For using in a small way, a common can, with plunge-cover, having a tight-fitting flange as deep as the can, will be all that is necessary to obtain a sufficient atmospheric pressure, whether forced down by hand and fastened, or placed in position and the pressure given by the air-pump.

In the accompanying drawing, A, Fig. 1, represents the water-vat; B, the milk-vat; C, the inverted vat or cover when partly closed; E E, ratchets on crank-shafts, used in drawing the inverted vat down to give the pressure; H H, straps of strong belting connecting the water-vat with the shafts on the inverted vat. D D are strips of wood fastened to the inverted vat to strengthen it and prevent expansion by the compressed air. T is a tube, to which the air-pump is attached, (stop-cock and other attachments not shown.) Fig. 2 represents a transverse section of a vat when closed.

Having now described my invention, and how it may be carried out in practice, I would state that I do not wish to be restricted to the particular apparatus shown and described, as it will be obvious that other forms of apparatus for applying the atmospheric pressure may be used with the same result.

What I claim as new, and desire to secure by Letters Patent, is—

1. As an improved mode of liberating cream from milk, the application to milk contained in a closed vessel of pressure artificially applied through the medium of atmospheric air, substantially as described.

2. The combination, with the water-tank A and the milk-containing vessel B, of the inverted tank or cover C, and mechanism for forcing said inverted tank or cover, when filled with air, down into the tank A around the milk-vessel B, substantially as described.

JAMES S. WATROUS.

Witnesses:
W. E. WATROUS,
O. M. BRIGGS.